Figure 1:
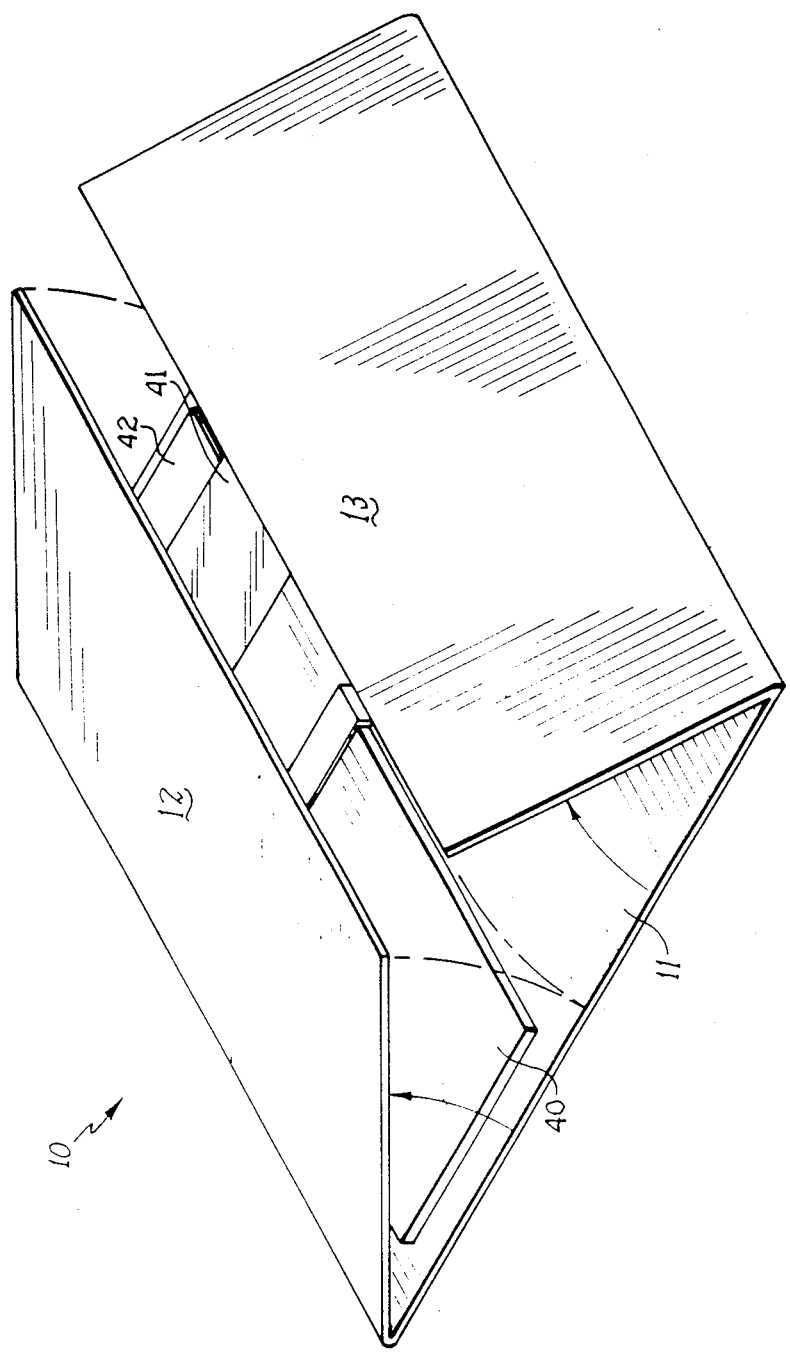

United States Patent [19]

Prentice

[11] Patent Number: 4,964,656
[45] Date of Patent: Oct. 23, 1990

[54] TELEPHONE MARKETING DEVICE

[75] Inventor: John W. Prentice, Batesville, Ind.

[73] Assignee: Forethought Life Insurance Company, Batesville, Ind.

[21] Appl. No.: 182,383

[22] Filed: Apr. 18, 1988

[51] Int. Cl.$^5$ .................... B42D 1/00; B42D 5/00; G09F 19/00

[52] U.S. Cl. .................... 281/44; 281/31; 40/534

[58] Field of Search .................... 281/15 B, 16, 17, 31; 40/534, 533, 532, 535; 150/47, 52 B; 206/425

[56] References Cited

U.S. PATENT DOCUMENTS

| | | | |
|---|---|---|---|
| 2,149,488 | 3/1939 | Ainsworth | 40/534 |
| 2,299,319 | 10/1942 | Gale | 281/15 B |
| 2,610,421 | 9/1952 | Horn | 40/53 X |
| 2,902,295 | 9/1959 | Slaubaugh | 281/15 B |
| 4,004,690 | 1/1977 | Giarritta | 150/47 |
| 4,301,962 | 11/1981 | Monckton et al. | 281/31 |
| 4,529,226 | 7/1985 | Weinman | 281/15 B |
| 4,575,126 | 3/1986 | Grubbs | 281/31 |
| 4,589,544 | 5/1986 | Schweinsberg | 206/425 |
| 4,614,450 | 9/1986 | Neiman | 281/31 |

FOREIGN PATENT DOCUMENTS 3032346  3/1982  Fed. Rep. of Germany .... 150/52 B

Primary Examiner—Frank T. Yost
Assistant Examiner—Paul M. Heyrana, Sr.
Attorney, Agent, or Firm—Wood, Herron & Evans

[57] ABSTRACT

A telephone marketing device has a center and two outboard panels. The outboard panels have shingled pockets containing cards. The card titles are exposed at the edge of the shingled pockets. The subject matter relating to the titles on each card is concealed by the overlying pocket.

4 Claims, 3 Drawing Sheets

TELEPHONE MARKETING DEVICE

BACKGROUND OF THE INVENTION

This invention relates to a telephone marketing device, and more particularly, to a folder containing immediately accessible information for dealing with respondents in a telephone conversation.

While the invention is suitable for use in a wide variety of telephone marketing activities, in order to provide a complete understanding of the invention the invention will be described in relation to that activity for which it was originally designed, namely, that of planning and funding funerals.

The planning and funding of funerals is an insurance program. The insurance company enlists the support of funeral directors to present the program to prospects who ultimately will be interred by the funeral director.

The funeral director and the prospect plan the funeral. Planning includes selecting of desired services, the casket, the burial place and the like. The cost to the prospect is determined on the basis of the cost that day of providing the services and products requested. The policy is written by the insurance company that will provide the funds for the funeral as planned regardless of when the death of the prospect occurs.

Critical to the marketing of the insurance program is the enlisting of funeral directors and training them to market the program directly to prospects.

BRIEF SUMMARY OF THE INVENTION

To that end, the invention has been created. The invention places, at the fingertips of the caller, the preferred manner of responding to objections or dealing with the situations likely to arise in the course of telephone calls to the prospect. It consists of a folder containing shingled pockets that leave exposed strips at the lower edges of the pockets. Cards are inserted in the pockets, the cards having brief titles that are displayed through the exposed pocket strips. The cards have detailed subject matter relating to each title printed on that portion of the card that is normally concealed by the overlying pocket and card.

More specifically, the invention contemplates a folder having a center panel and two outboard panels. Both outboard panels have the shingled pockets described above. One group of shingled pockets relates to the initial call to the prospect. The titles on the cards inserted in the pockets are the various objections of the prospect. "Not interested," "Spouse won't talk about it," and "Too busy" are representative objections. On each card, above the title, is a sample response. The function of the response is to assist the funeral director or one of his staff in persuading the prospect to let the funeral director mail the prospect an explanatory booklet.

The second set of shingled pockets on the other panel is "Follow-up scripts to set the Appointment." In using these cards, it is usually assumed that the prospect has been sent an explanatory booklet and now an attempt is made to arrange for an appointment with the prospect to explain the plan more fully and to close the sale. The titles of the cards set forth a scenario. "The prospect had not received a letter," "The prospect had received a letter," "The letter was acknowledged," "The letter was not acknowledged," etc. On each card associated with the title is a proposed script for the representative of the funeral director to use in dealing with the prospect.

In the center panel, there is space for the mounting of a pad for taking notes, a pocket for appointment cards, an information card and whatever a funeral director's representative is believed to need in order to have a self-contained kit.

The folder is thought to be more of a training kit for the funeral director's representative than a tool for continuous use in the marketing of the planning and funding program. Since it is not feasible for the insurance company to spend extended periods of time with the funeral director and his staff, the folder of the present invention permits the insurance company to spend a brief period of time training those who will call prospects and then to let those callers rely on the scripts in the two panels to assist them in making their calls over their initial association with the program. Perhaps a month's use of the folder will suffice.

The obvious further advantage of the invention is that the titles and detailed information are set up in such a way that the representative would have no hesitancy, after hearing an objection, in turning immediately to the appropriate response. No more than about one second is required to lift the covering pockets by an angle of about 30°–45° to expose the appropriate response. With the response exposed, the representative can deliver the response without hesitation.

A still further advantage resides in the manner in which the folder will bolster the confidence of the caller during the first several calls made to prospects. Feeling assured that the way to deal with the prospect's objections are literally at the representative's fingertips will enable the representative to deal with the prospect in a polished manner that will instill confidence in the prospect.

Figure 2:
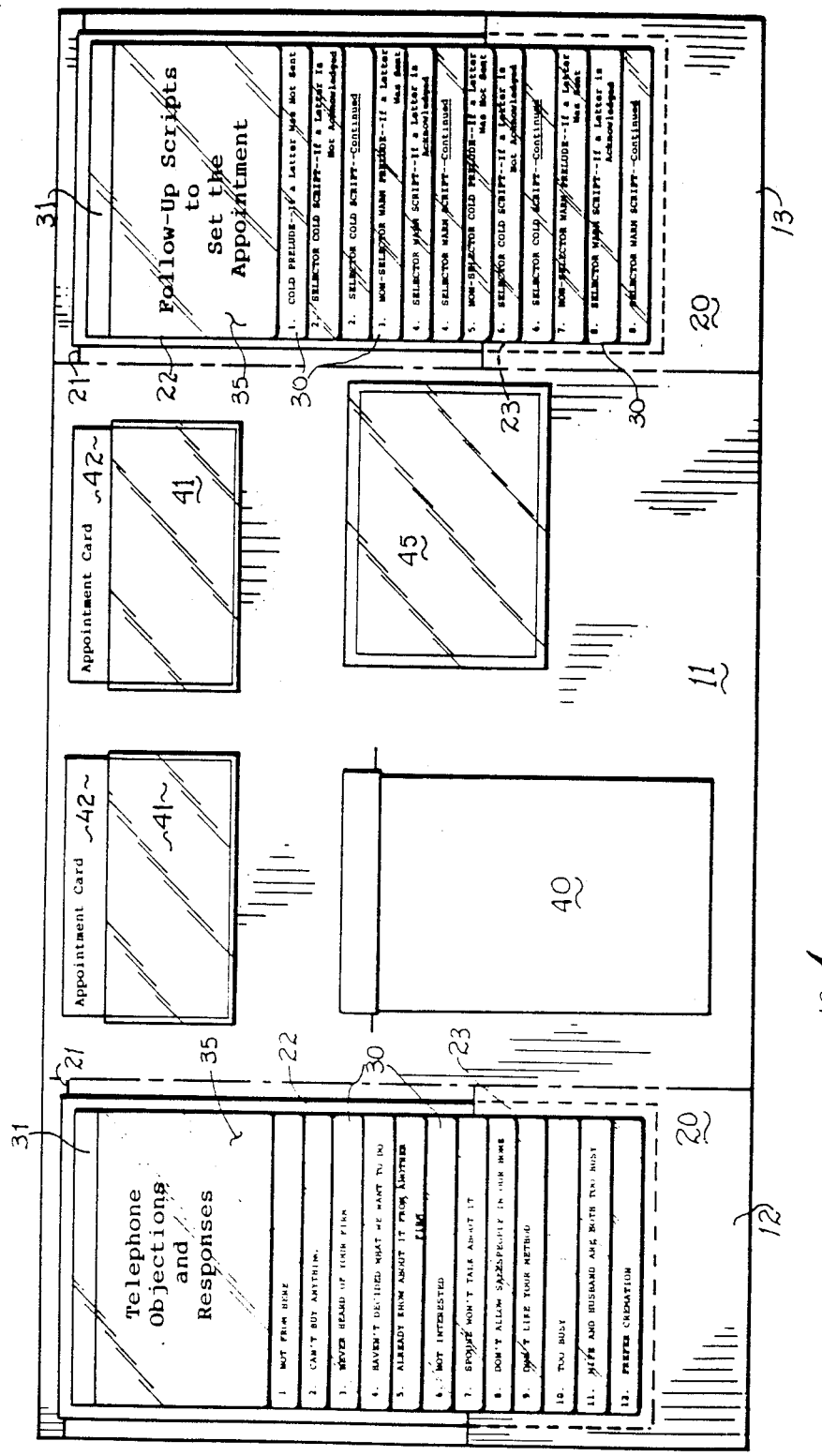
Figure 2A:
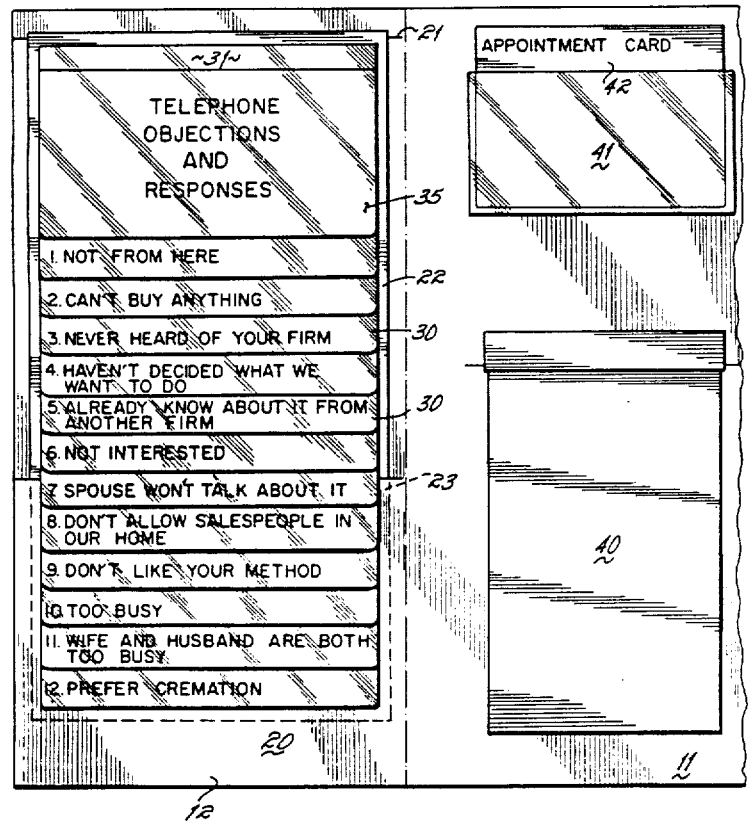
Figure 2B:
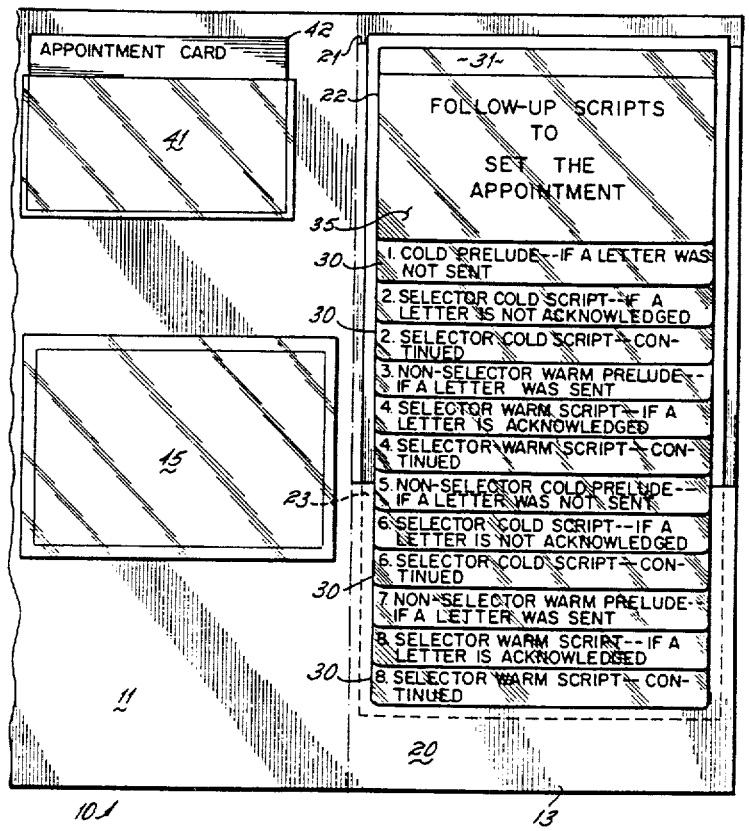
Figure 3:
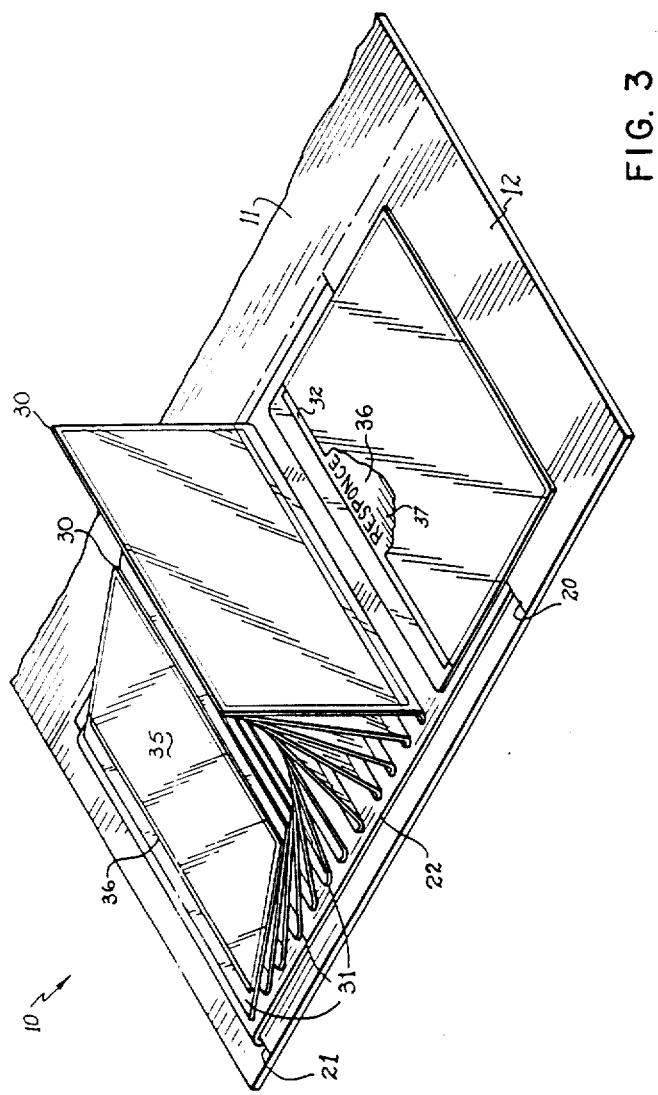

The several features and objectives of the invention will become more readily apparent from the following detailed description taken in conjunction with the accompanying drawings in which:

FIG. 1 is a perspective view of a folder of the present invention;

FIGS. 2A and 2B form is a plan view of the folder with the panels open; and

Figure 3:
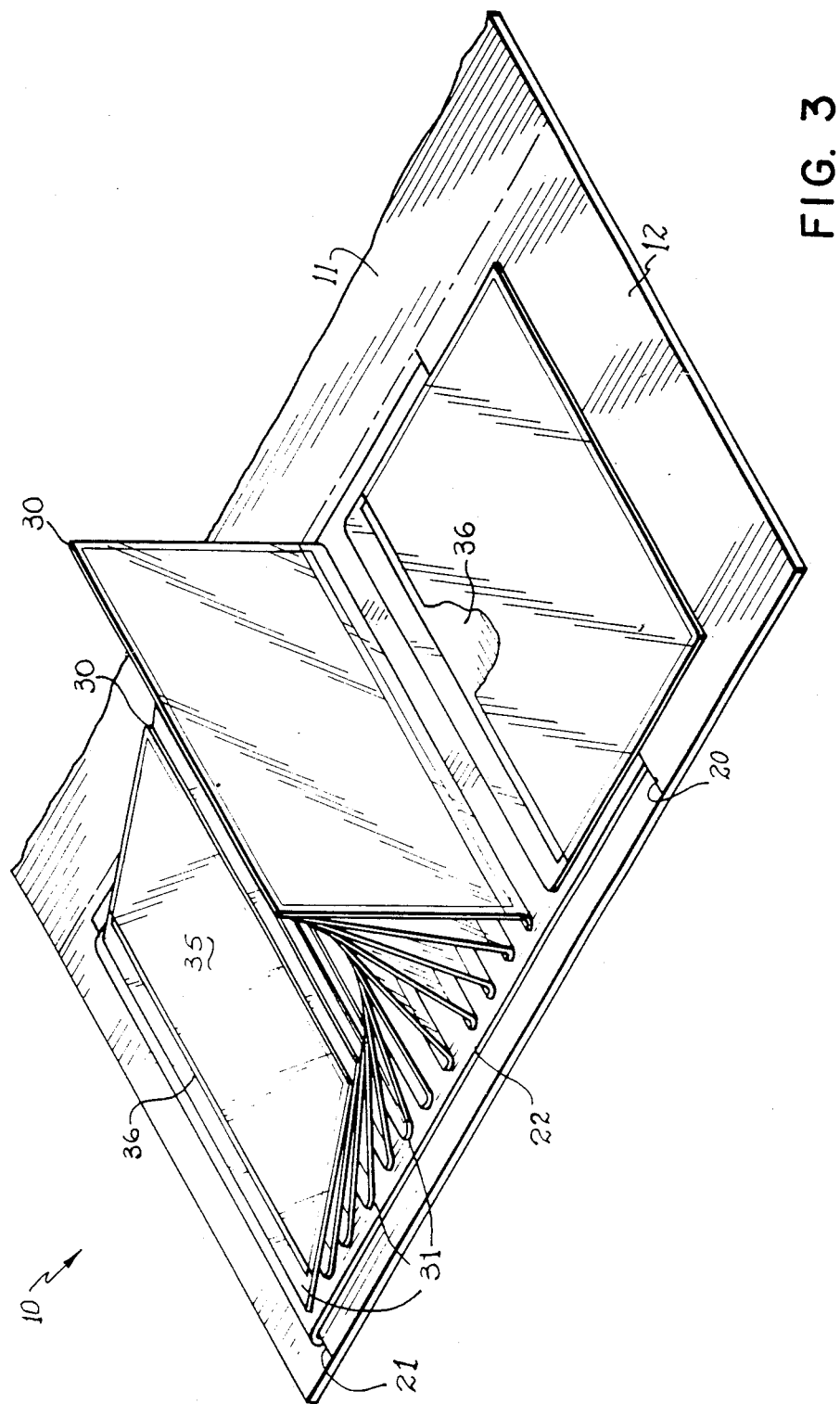
Figure 1:
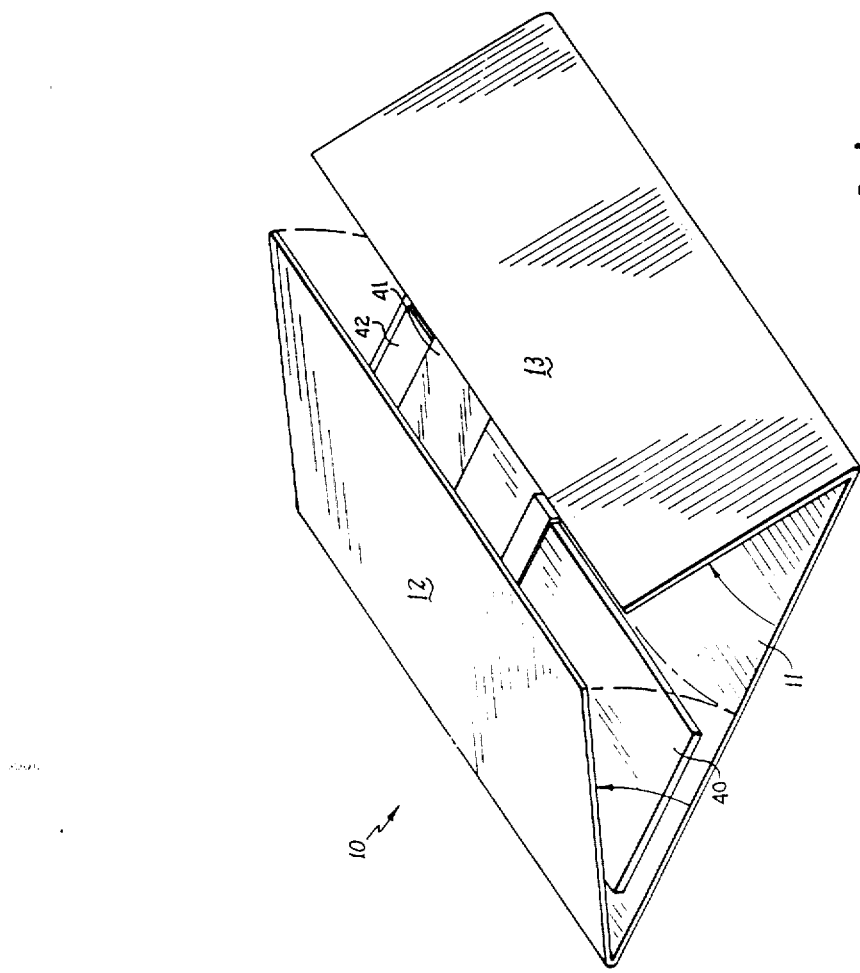

FIG. 3 is a perspective view of one panel of the folder showing the manner in which it is used:

The folder of the present invention is indicated at 10. It consists of a center panel 11, a left outboard panel 12 and a right outboard panel 13. Referring to FIGS. 2A and 2B, the left outboard panel has a lower pouch 20 and an upper pouch 21. A flat support 22 having a lower end 23 is tucked into the lower pouch 20. The upper end of the support is folded upon itself and is tucked into the upper pouch 21.

A plurality of shingled pockets 30 are. adhesively secured at their upper edges 31 to the flat support 22. The pockets are transparent. The uppermost pocket 35 contains a card displaying a general title. For example, "Telephone Objections and Responses" is a suitable title. The pockets below the upper pocket have an exposed strip that is approximately ¼ inch wide. A card, for example 4×6 inches, is placed in each of the lower pockets, each card having along its lower edge a title, in this case the title being one of the common objections that the respondent will give to the funeral director's representative. Those objections are shown in FIG. 2A. On each card above the title, in the area indicated at 36 in FIG. 3, there is a printed response 37 designed to meet the particular objection shown on the title strip.

In the operation of the elements on panel 12, when a respondent states an objection, the caller identifies the card having that objection, places his fingers on that card and pivots it about 45° upwardly, lifting all of the cards above it as shown in FIG. 3. The response to the particular objection is thus easily and quickly exposed so that it can be read or paraphrased by the funeral director's representative.

The structure on the right-hand panel 13 is identical to the structure on the left-hand panel. Accordingly, identical numbers are used for identical elements. In the marketing system specifically discussed, the right-hand cards are entitled "Follow-up Scripts to Set the Appointment," on the upper card in the pocket 35. This group of cards assumes different scenarios that would apply to different prospects. Those scenarios are indicated on the cards shown in FIG. 2. With respect to each scenario, there is a script for the caller to employ in dealing with the prospect.

On the center panel 11, a notepad 40 is mounted, two pockets 41 containing appointment cards 42 to be filled out during the use of the scripts on panel 13. Finally, another pocket 45 for a general message to the representative (for example, how to contact the Home Office) is provided. The upper panels 12 and 13 can be folded upon the center panel 11, thereby providing a folder that is conveniently handled and stored.

In the operation of the invention, the funeral director or one of his staff opens the folder to lay out the shingled cards. The prospect is called and an attempt is made to interest the prospect in reading about the concept of planned-prepaid funerals. Some prospects will have an objection. When hearing that objection, the caller places his fingers on the card having that objection and raises the cards above it to expose the manner of dealing with the objection. The caller follows or paraphrases the suggested script.

A notation can be made on pad 40 of any pertinent points arising during the call.

At a later time, the caller will call a prospect to set up an appointment. The manner of dealing with the particular prospect will depend upon what introduction the prospect has had to the program. The caller will select the card having the script appropriate to that scenario and will use that script or paraphrase of it in dealing with the prospects. If an appointment is made, one of the appointment cards can be filled out.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

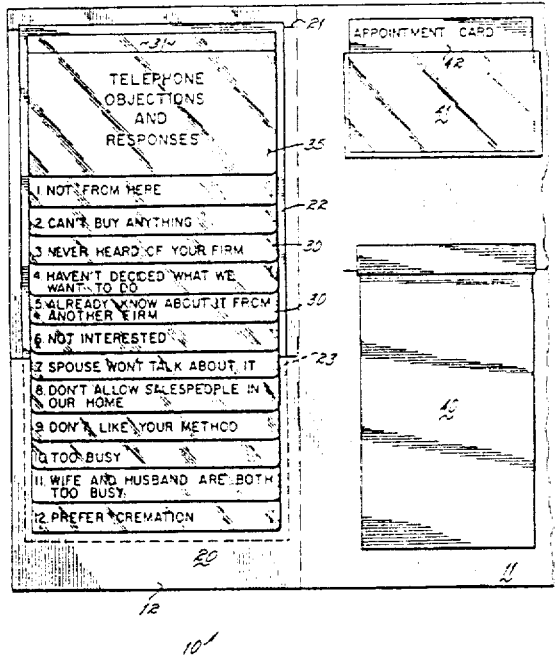

I claim:

1. A telephone marketing device for guiding a salesman through a variety of situations in dealing with a prospect comprising,
   a panel,
   a plurality of transparent pockets mounted on said panel in vertically shingled relation, with upper pockets lying over lower pockets, each pocket presenting an exposed strip at its lower edge,
   a card in each pocket,
   each card having at its lower edge a title that defines a situation, such as a telephone objection or a situation concerning the setting of an appointment, the title being positioned within said strip so as to be exposed, all titles being visible when said shingled pockets lie flat on said panel,
   each card having, above said title, printed subject matter that specifically guides the salesman in dealing with the situation defined in said title, said guiding subject matter being exposed only when an overlying pocket is raised.

2. A device as in claim 1 in which said titles are sample objections likely to be received from a respondent to a telephone call,
   said related subject matter on each card being a sample response to the objection appearing on the title strip.

3. A telephone marketing device for guiding a salesman through a variety of situations in dealing with a prospect comprising,
   a three panel folder consisting of a center panel and two outboard panels,
   a plurality of vertically shingled pockets on said outboard panels, each pocket having an exposed strip at its lower edge,
   a card in each pocket,
   each card having at its lower edge at title that defines a situation that the salesman must deal with, said title being positioned within said strip so as to be exposed, all titles being visible when said shingled pockets lie flat on said panels,
   each card having, above said title, printed subject matter that specifically guides the salesman in dealing with the situation defined in said title, said subject matter being exposed only when an overlying pocket is raised,
   all of the cards on one panel having respondent objections as the title and printed replies to said objections as the related subject matter,
   each of the cards on said other panel relating to making prospect appointments and having as a title a specific situation regarding an appointment with a prospect, and having above said title printed suggestions as to how to, deal with the situation regarding an appointment.

4. A telephone marketing device as in claim 3 further comprising,
   a flat support for each group of shingled pockets, each flat support having a lower end, each said flat support having an upper end portion folded over upon itself and extending downwardly,
   each said outboard panel having an upper and a lower pouch, the upper and lower ends of said flat support being inserted into said upper and lower pouches, respectively, to mount said shingled pockets to a respective panel.

* * * * *

UNITED STATES PATENT AND TRADEMARK OFFICE
CERTIFICATE OF CORRECTION

PATENT NO. : 4,964,656  Page 1 of 7
DATED : October 23, 1990
INVENTOR(S) : John W. Prentice It is certified that error appears in the above-identified patent and that said Letters Patent is hereby corrected as shown below:

The title page should be deleted to appear as per attached title page.

Column 2, line 44, delete "is".

Column 2, line 59, after "card" insert -- 32 --.

Column 3, line 19, after "Fig. 2" insert -- B --.

Column 4, line 32, change "at" (2nd occurrence) to --a--.

Fig. 2A, Sheet No. 2, should be added.

Fig. 2B, Sheet No. 3, should be added, Figs. 2A and B replacing Fig. 2.

Fig. 3, Sheet No. 4, replaces Fig. 3 (now Sheet No. 3 in the patent).

UNITED STATES PATENT AND TRADEMARK OFFICE
CERTIFICATE OF CORRECTION

PATENT NO. : 4,964,656

DATED : October 23, 1990

INVENTOR(S) : John W. Prentice

It is certified that error appears in the above-identified patent and that said Letters Patent is hereby corrected as shown below:

On sheet No. 4 of the drawings (Fig. 3), the word "RESPONCE" should be -- RESPONSE -- .

Signed and Sealed this

Twenty-second Day of September, 1992

*Attest:*

DOUGLAS B. COMER

*Attesting Officer*  *Acting Commissioner of Patents and Trademarks*

United States Patent [19]

Prentice

[11] Patent Number: 4,964,656

[45] Date of Patent: Oct. 23, 1990

[54] TELEPHONE MARKETING DEVICE

[75] Inventor: John W. Prentice, Batesville, Ind.

[73] Assignee: Forethought Life Insurance Company, Batesville, Ind.

[21] Appl. No.: 182,383

[22] Filed: Apr. 18, 1988

[51] Int. Cl.⁵ .......... B42D 1/00; B42D 5/00; G09F 19/00

[52] U.S. Cl. .................. 281/44; 281/31; 40/534

[58] Field of Search ............ 281/15 B, 16, 17, 31; 40/534, 533, 532, 535; 150/47, 52 B; 206/425

[56] References Cited

U.S. PATENT DOCUMENTS

| | | | |
|---|---|---|---|
| 2,149,488 | 3/1939 | Ainsworth | 40/534 |
| 2,299,319 | 10/1942 | Gale | 281/15 B |
| 2,610,421 | 9/1952 | Horn | 40/53 X |
| 2,902,295 | 9/1959 | Slaubaugh | 281/15 B |
| 4,004,690 | 1/1977 | Giarritta | 150/47 |
| 4,301,962 | 11/1981 | Monckton et al. | 281/31 |
| 4,529,226 | 7/1985 | Weinman | 281/15 B |
| 4,575,126 | 3/1986 | Grubbs | 281/31 |
| 4,589,544 | 5/1986 | Schweinsberg | 206/425 |
| 4,614,450 | 9/1986 | Neiman | 281/31 |

FOREIGN PATENT DOCUMENTS 3032346 3/1982 Fed. Rep. of Germany .... 150/52 B

Primary Examiner—Frank T. Yost
Assistant Examiner—Paul M. Heyrana, Sr.
Attorney, Agent, or Firm—Wood, Herron & Evans

[57] ABSTRACT

A telephone marketing device has a center and two outboard panels. The outboard panels have shingled pockets containing cards. The card titles are exposed at the edge of the shingled pockets. The subject matter relating to the titles on each card is concealed by the overlying pocket.

4 Claims 4 Drawing Sheets